Dec. 4, 1934.   E. H. HANSEN   1,983,079

METHOD AND MEANS FOR USE IN NAVIGATION

Filed July 6, 1931

INVENTOR.

E. H. Hansen

Patented Dec. 4, 1934

1,983,079

UNITED STATES PATENT OFFICE 1,983,079

METHOD AND MEANS FOR USE IN NAVIGATION

Edmund H. Hansen, Los Angeles, Calif.

Application July 6, 1931, Serial No. 548,738

10 Claims. (Cl. 250—11)

This invention relates to a method and a means for use primarily in navigating ships under adverse conditions. With certain modifications the method and the apparatus involved may be made adaptable for other uses such as airplanes and land uses.

The principal object of this invention is to provide a method whereby ships at sea may determine the angular relation of other ships and also the course upon which other ships are traveling. The invention has been designed primarily for use by ships during low visibility upon the sea and finds a particular usefulness in foggy weather. The means employed depends upon radio wave propagation, and makes use of different frequencies impressed upon the radio wave to indicate the course of the transmitting ship. In practice each ship is equipped with a transmitting equipment which equipment is controlled by the ship's compass to broadcast audio frequency modulated waves of predetermined frequencies, in accordance with the course which the ship is following. In addition to the broadcasting equipment a directional receiving equipment is also used which indicates the direction of the incoming wave and in conjunction with the directional receiving equipment a frequency meter is employed which, according to a predetermined code of frequencies, shows the course which the transmitting ship is following.

The broadcasting system employed consists in general of a transmitter which transmits an unmodulated wave of a standardized radio frequency. This unmodulated wave is modulated by an impressed audio frequency which is in turn controlled by the compass of the ship. It is evident in this arrangement that for every degree of the compass or for every multiple of a degree a modulation consisting of a predetermined audio frequency would thus indicate the course which the transmitting ship is pursuing. It is to be understood that the frequencies corresponding to the degrees of the compass would be standardized for all ships according to existing circumstances and would in effect become a common code.

The transmitter would preferably propogate waves of low power which would have a limited range. This would obviate interfering with other broadcasting stations and would serve the purpose of this invention since the invention has been designed primarily to give to ships information of other ships which are in close proximity.

The means used to receive and resolve the waves in a manner to make use of the special broadcasting system consists of a loop antenna arranged to receive radio waves and indicate the incoming direction thereof. Conventional amplifying means are employed in conjunction with the loop antenna and serve to amplify the signal which is then transmitted to a loud speaker and also to a frequency meter. The loud speaker is for the purpose of audibly indicating the identity of the transmitting ship which is brought about by an interruption of the broadcast signal at spaced intervals and may be so arranged as to transmit the call letters of the ship. The frequency meter operates to indicate the audio frequency which has been impressed upon the radio wave and according to the common code hereinbefore mentioned denotes the course of the transmitting ship.

It therefore becomes a further object of this invention to provide a means for determining the relative angular position of ships and the course which each ship is pursuing. Throughout the specifications the description will be directed toward a specific description of means for the purpose described. It will be evident, however, that the means shown is only exemplary and may be modified and changed without in any way altering the principle of the invention involved.

Other objects and advantages will become apparent as the description proceeds in conjunction with the drawing in which.

Figure 1:
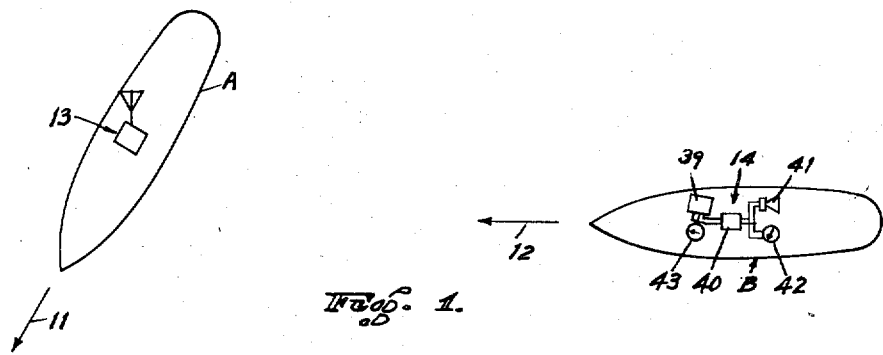
Figure 1 is a diagrammatic sketch showing the relative position of two ships employing my invention.
Figure 2:
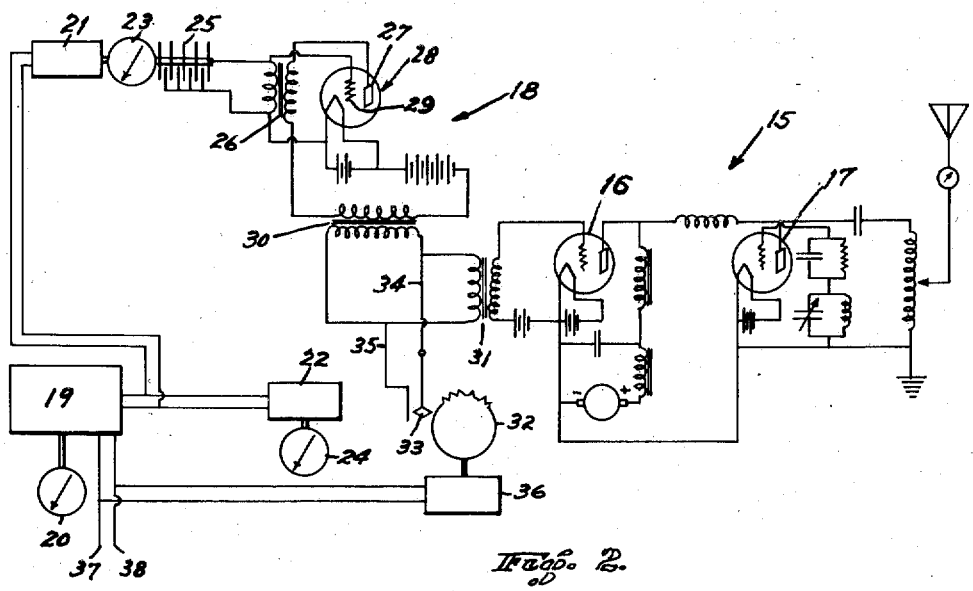
Figure 2 is a diagrammatic wiring diagram of the transmitting equipment.
Figure 3:
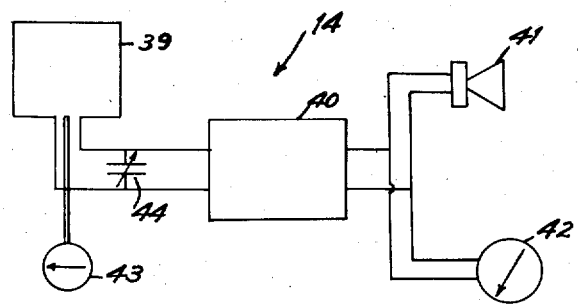
Figure 3 is a diagrammatic illustration of the receiving equipment employed.

In the drawing I have shown two ships A and B illustrated in Figure 1. In this view the ship A has been shown as the transmitting ship and the ship B has been shown as the receiving ship. In practice, however, both the ships A and B would be equipped with transmitters and receivers. The ship A is proceeding upon the course indicated by the arrow 11 and the ship B is following the course indicated by the arrow 12. Upon the ship A, I have diagrammatically shown a transmitting equipment generally indicated by the numeral 13. Upon the ship B, I have shown a receiving equipment generally indicated by the numeral 14. In Figures 2 and 3, I have more fully illustrated the transmitting equipment 13 and the receiving equipment 14 respectively. Referring to Figure 2, the transmitting equipment is seen to comprise generally the before mentioned transmitter generally indicated by the numeral 15, comprising triodes 16 and 17 with attendant instrumentalities and a modulating unit generally indicated by the numeral 18 which in turn is controlled by a master gyro compass 19. The invention is not to be limited to this particular type of compass, however, since other types may be used equally as well. No detailed description will be entered of the transmitter 15 since this type of transmitter is of known design and since other types of transmitters will fulfill the purpose. The means whereby I modulate the transmitter 15 will be more fully described since it is a part of the invention. As shown the gyro compass 19 is equipped with a conventional dial 20 which indicates the course of the ship. The compass 19 also operates synchronous repeaters 21 and 22 of known construction which in turn control dials 23 and 24 respectively. The repeater 22 for purposes of convenience may be in the pilot house of the ship, while the repeater 21 operates a variable condenser 25 which is connected in a circuit with one leg of a transformer 26. The condenser 25 is designed to operate through a complete circumference, that is, from 0 to 360 degrees, and follows the movement of the compass 19 by means of the repeater 21. The other leg of the transformer 26 is connected to the plate 27 of an oscillator tube 28. The grid 29 of the tube 28 is controlled by the condenser 25 and serves to oscillate the tube 28 in accordance with the position of the master compass 19. The plate circuit of the tube 28 passes through one leg of a second transformer 30. The other leg of the transformer 30 is connected to one leg of a third transformer 31, the other leg of the transformer 31 being connected to the transmitter 15. It thus becomes obvious that the condenser 25 controls the oscillations of the oscillator tube 28 which oscillations in practice are of audio frequency. These audio frequency oscillations being impressed upon the transmitter 15 will modulate the transmitter circuit accordingly, and as before stated the various audio frequencies of the transmitter will indicate the course of the transmitting ship.

Another feature of my invention resides in a means for incorporating the call letters of a ship into the transmitted wave of whatever frequency. Such a means is shown as an automatic key which is shunted across the output of the transformer 30. This means I have illustrated as comprising a toothed wheel 32 which may be formed to represent the call letters of a ship and which operates a key switch 33 between the conductors 34 and 35 connected across the output of the transformer 30. The wheel 32 may be continuously operated by means of a motor 36 or it may be operated only at intervals whichever is desired. A source of power is conducted to the system through conductors 37 and 38 and the motor 36 may be driven continuously or interruptedly by the source.

In the Figure 3, I have diagrammatically illustrated a type of receiving equipment that may be employed for the purpose of this invention. In this view I have shown a loop antenna 39 connected to a radio receiver and amplifying unit 40. The output of the unit 40 is divided and operates a loud speaker 41 and a frequency meter 42. The speaker 41 is for the purpose of audibly indicating the interruptions in the incoming signal and the frequency meter 42 is used to determine the audio frequency impressed upon the radio waves. For purpose of providing the utmost utility the loop antenna 39 may be equipped with a dial 43 which indicates in degrees the position of the loop. A variable condenser 44 is used for tuning the loop to receive the incoming signal.

In operation the ship A would transmit through the transmitter 13 a radio carrier wave having an audio frequency impressed thereon corresponding to the position of the compass on the ship. This wave would be picked up by the ship B by means of the loop 39 which would not only indicate the relative angular position of the two ships, but at the same time the frequency meter 42 would show the audio frequency of the broadcast wave which according to the common code hereinbefore mentioned would indicate the course of the ship A. During the broadcasting the toothed wheel 32 on the ship A would interrupt the signal to send the call letters of the ship thus identifying the transmitting ship. These interruptions would in turn be audibly indicated through the loud speaker 41 of the ship B. It thus becomes apparent that the ship B by means of the apparatus described knows the relative angular position of the ship A, the course of ship A, and the identity of the ship A. All this information is obtained in one operation, namely, by the setting of the loop 39 to receive the signal from the ship A.

Although I have shown my invention as embodying a means for practicing the method involved, nevertheless I am aware that other means may be employed. I therefore do not intend this invention to be restricted to the specific means shown, but to include all equivalent means which will operate for the purpose described.

I claim:

1. For use in navigation, an apparatus embodying: a radio wave transmitter adapted to be mounted upon a moving object and transmit radio waves of a fixed frequency; means for modulating said radio waves to indicate the course of the moving object, said means including a compass controlled condenser adapted to control an oscillating circuit arranged to impress predetermined audio frequencies upon said radio waves differing in frequency in every increment of direction of the compass.

2. In combination: a compass for determining the course of a moving object; a radio wave transmitter mounted upon said moving object and adapted to transmit radio waves of a certain frequency; an oscillating circuit arranged to modulate said radio waves; a condenser operable through a cycle differing in frequency in every increment of direction on said compass for controlling said oscillating circuit; means for operating said condenser through the movement of said compass, and directional receiving means at a remote point for receiving said modulated waves to determine the incoming direction and the modulation thereof.

3. In combination: a compass for determining the course of a moving object; a radio wave transmitter mounted upon said moving object and adapted to transmit radio waves of a predetermined frequency; means for modulating said waves in accordance with the position of the compass; means for interrupting the modulating means to indicate the identity of the moving object; directional receiving means at a remote point for receiving said modulated waves to determine the incoming direction and the modulation thereof and a loud speaker operated by said receiving means for audibly indicating said interruptions.

4. For use in navigation: a radio wave transmitter adapted to be mounted upon a moving object and transmit carrier waves of a predetermined frequency; means for modulating said carrier wave in accordance with the course the moving object is traveling relative to a compass, an oscillating circuit arranged to modulate said radio waves; a condenser operable through a cycle differing in frequency in every increment of direction on said compass for controlling said oscillating circuit; means for operating said condenser through the movement of said compass, and directional receiving means at a remote point for receiving said modulated waves and determining the modulated frequency thereof.

5. For use in navigating two moving objects in close proximity: a radio wave transmitter adapted to be mounted upon each of said moving objects and transmit radio waves of substantially the same fixed frequency; compass controlled means on each of said objects for modulating said radio waves with various audio frequencies in accordance with the position of the compass on each object, an oscillating circuit arranged to modulate said radio waves; a condenser operable through a cycle differing in frequency in every increment of direction on said compass for controlling said oscillating circuit; means for operating said condenser through the movement of said compass, and directional receiving means on each of said objects for receiving the transmitted waves from the other of said objects to determine the incoming direction and the audio frequency modulation thereof.

6. For use in navigation: a radio wave transmitter adapted to be mounted upon a moving object and transmit carrier waves of a predetermined frequency; means for modulating said carrier waves with various audio frequencies to indicate the course of the moving object relative to a compass; means for interrupting said modulating means at spaced intervals to indicate the identity of the moving object; directional receiving and amplifying means at a remote point for receiving said modulated waves to determine the incoming direction and the audio frequency modulation thereof and a loud speaker operated by said receiver and amplifying means to audibly indicate the interruptions in the received signal.

7. A method for transmitting the course of a moving object consisting in: continuously modulating a carrier wave through a cycle of audio frequencies differing in frequency in accordance with the points on a compass; controlling the audio frequency modulation by the movement of the compass, and indicating the course of the moving object by predetermined transmitted frequencies.

8. A method for transmitting courses consisting in: indicating the points of a compass by continuous modulation of a carrier wave, said modulation differing in frequency for every increment of direction on the compass and controlling the modulation by the movement of the compass.

9. A method for transmitting the course of a moving object consisting in: transmitting a carrier wave continuously modulated by audio frequencies differing in frequency for every increment of direction on a compass and controlling the audio frequency modulation by the movement of the compass.

10. For use in navigation: means for transmitting a carrier wave from a moving object; means for modulating said carrier wave with continuous audio frequency differing in frequency for every increment of direction on a compass, said means including a compass; a condenser operable through a cycle corresponding to the points on said compass and means for operating said condenser through the movement of the compass.

EDMUND H. HANSEN.